(12) United States Patent
Shimada et al.

(10) Patent No.: US 7,483,704 B2
(45) Date of Patent: Jan. 27, 2009

(54) BASE STATION AND COMMUNICATION METHOD

(75) Inventors: Naoto Shimada, Yokosuka (JP); Rie Nagato, Yokosuka (JP); Osamu Nakamura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 59 days.

(21) Appl. No.: 10/368,698

(22) Filed: Feb. 20, 2003

(65) Prior Publication Data
US 2003/0190892 A1  Oct. 9, 2003

(30) Foreign Application Priority Data
Feb. 20, 2002  (JP) ............... P2002-043937

(51) Int. Cl.
*H04Q 7/20* (2006.01)
(52) U.S. Cl. .................... 455/453; 455/447
(58) Field of Classification Search ............ 455/450, 455/452.1, 525, 456, 512, 437, 69, 453; 370/342, 370/335
See application file for complete search history.

(56) References Cited

U.S. PATENT DOCUMENTS

| | | | | |
|---|---|---|---|---|
| 5,666,655 A | * | 9/1997 | Ishikawa et al. | 455/512 |
| 5,838,671 A | * | 11/1998 | Ishikawa et al. | 370/335 |
| 6,131,035 A | * | 10/2000 | Ohkubo et al. | 455/450 |
| 6,259,685 B1 | * | 7/2001 | Rinne et al. | 370/330 |
| 6,304,755 B1 | * | 10/2001 | Tiedemann et al. | 455/437 |
| 6,611,676 B2 | * | 8/2003 | Ue et al. | 455/69 |
| 6,760,599 B1 | * | 7/2004 | Uhlik | 455/525 |
| 6,799,044 B1 | * | 9/2004 | Wesby et al. | 455/452.1 |
| 6,801,515 B1 | * | 10/2004 | Ishikawa et al. | 370/342 |
| 6,804,216 B1 | * | 10/2004 | Kuwahara et al. | 370/335 |
| 6,850,764 B1 | * | 2/2005 | Patel | 455/450 |
| 2003/0148774 A1 | * | 8/2003 | Naghian et al. | 455/456 |

FOREIGN PATENT DOCUMENTS

| | | | |
|---|---|---|---|
| JP | 5-130668 | | 5/1993 |
| JP | 05-130668 | | 5/1993 |
| JP | 09-069824 | * | 3/1997 |
| JP | 9-69824 | | 3/1997 |
| JP | 10-126842 | | 5/1998 |
| JP | 2000-32530 | | 1/2000 |
| JP | 05-130668 | * | 5/2003 |

* cited by examiner

*Primary Examiner*—Duc Nguyen
*Assistant Examiner*—Chuck Huynh
(74) *Attorney, Agent, or Firm*—Oblon, Spivak, McClelland, Maier & Neustadt, P.C.

(57) ABSTRACT

A base station comprises: an interference quantity measurement unit configured to measure an interference quantity toward a frequency band used in a communication system in which the base station is provided; an allowable interference quantity calculation unit configured to calculate an allowable interference quantity toward the frequency band, which is allowed to maintain a determined number of terminal equipments connecting lines with the base station, based on the measured interference quantity and the determined number of the terminal equipments; a reception unit configured to receive a request of connecting the line transmitted by the terminal equipment; and an acceptance control unit configured to control an acceptance of the request for connecting the line by comparing the measured interference quantity with the allowable interference quantity.

6 Claims, 6 Drawing Sheets

BASE STATION AND COMMUNICATION METHOD

CROSS REFERENCE TO RELATED APPLICATIONS

This application is based upon and claims the benefit of priority from the prior Japanese Patent Application No. 2002-43937, filed on Feb. 20, 2002; the entire contents of which are incorporated herein by reference.

BACKGROUND OF THE INVENTION

1. Field of the Invention

The present invention relates to a base station and a communication method.

2. Description of the Related Art

A communication system using a radio wave with a certain frequency band and a communication system using a radio wave with a frequency band close to that of the communication system before generate interference waves toward each other's frequency bands. As a result, interference between the communication systems occurs. For example, unnecessary waves such as leakage power and spurious power of one communication system become the interference waves for the other communication system.

As a method to avoid the interference between the communication systems, the one, which provides frequency bands called a guard band between the frequency bands used by the respective communication systems, has been heretofore used. Besides this method in order to avoid the interference, a random assign by a carrier sense has been used. This is a method to avoid the interference between the communication systems in the following manner: Noise power values of frequencies are measured, and a frequency containing large noise power is judged that it is interfered from other communication systems. Then, a frequency with less noise power is used.

In addition, as to the interference wave such as the spurious power generated in a specific frequency, a method has been used, which avoids the interference by switching a time slot and changing timing of transmission/reception or by switching a frequency. Furthermore, a method has been used, in which a transmitter transmits signals, which are spreaded over a wide frequency band by spreading codes, and then a receiver spreades when the receiver demodulates the spreaded signals, thus removing the interference wave components.

However, in the conventional method to provide the guard band, when a frequency band except the frequency band used by the communication system is wide, the guard band provided between the frequency bands of the communication systems has needed to be made wide. Therefore, the guard band using a wide frequency band has been provided for the interference between the systems, which changes depending on locations of a base station and a terminal equipment, which constitute the communication system and does not occur all the time. As a result, the use efficiency of the frequency has been decreased. Furthermore, in the case of the random assign by the carrier sense, the frequency is not used, which is judged that it is interfered from other communication system for the reason that it shows large noise power in measuring the noise power. Accordingly, the use efficiency of the frequency has been decreased.

As a result of the decrease in the use efficiency of the frequency as described above, the base station constituting the communication system can not maintain satisfactorily the number of terminal equipments connecting lines with the base station, that is, the number of users accommodated in the communication system (hereinafter referred to as a "user capacity"), who use the communication system. Thus the base station has not been able to maintain communication quality.

Although the switching of the time slot and the switching of the frequency are effective for the interference wave such as the spurious power which is generated in the specific frequency, they can not deal with the interference wave such as the leakage power, which extends all over the frequencies. Furthermore, with a CDMA-TDD system using a narrow frequency band, frequency switching cannot be performed. For this reason, the method to avoid the interference wave by switching the frequency can not be applied to the CDMA-TDD system. Accordingly, the base station has not been able to avoid influences due to the interference from other communication systems even if the methods above were employed. Thus, the base station has not been able to maintain the user capacity satisfactorily, and maintain the communication quality.

On the other hand, the method to remove the interference wave component by the despreading is effective to the interference all over the used frequency band and continuous interference. Therefore, this method has an advantage that interference can be somewhat avoided. However, even with this method, when a certain quantity of interference or above is generated, the user capacity comes to be incapable of being maintained satisfactorily, and it makes it impossible to maintain communication quality.

Furthermore, even when the interference increases and the user capacity decreases, the terminal equipment located near the base station is easily connected to the base station, since the terminal equipment has leeway in transmission power. However, since a terminal equipment located at the edge of a wireless area does not have leeway in the transmission power, it becomes difficult to connect the terminal equipment to the base station, as the user capacity decreases due to an interference increase. Specifically, when the interference increases and the user capacity decreases, the terminal equipment located near the base station comes to connect a line with the base station more easily than the terminal equipment located at the edge of the wireless area covered with the base station. Therefore, terminal equipments connecting lines and communicating with the base station concentrate near the base station. Then, the user capacity at the edge of the wireless area covered by the base station is decreased. As a result, a density distribution of the terminal equipments connecting lines with the base station is more near the base station, and less at the edge of the wireless area.

As described above, it has been impossible to maintain a constant density distribution of the terminal equipments communicating with the base station. Therefore, it has been impossible to maintain the user capacity uniformly in the wireless area. Consequently, in an area where the communication system offers communication services, a situation turns disadvantageous to the terminal equipments located at the edge of the wireless area, and it has been difficult to offer the communication services equally to the plurality of terminal equipments.

BRIEF SUMMARY OF THE INVENTION

An object of the present invention is to provide a base station capable of maintaining a user capacity in a communication system, and capable of maintaining communication quality.

A base station of an aspect according to the present invention comprises: an interference quantity measurement unit configured to measure an interference quantity toward a frequency band used in a communication system in which the base station is provided; an allowable interference quantity calculation unit configured to calculate an allowable interference quantity toward the frequency band, which is allowed to maintain a determined number of terminal equipments connecting lines with the base station, based on the measured interference quantity and the determined number of the terminal equipments; a reception unit configured to receive a request of connecting the line transmitted by the terminal equipment; and an acceptance control unit configured to control an acceptance of the request for connecting the line by comparing the measured interference quantity with the allowable interference quantity.

According to the base station, the interference quantity measurement unit measures the interference quantity toward the frequency band used in the communication system where the base station is provided. Furthermore, the allowable interference quantity calculation unit calculates the allowable interference quantity toward the frequency band, which is allowed to maintain the target number of terminal equipments previously determined (hereinafter, referred to as a "target user capacity"), as the number of the terminal equipments connecting lines with the base station. At this time, the allowable interference quantity calculation unit calculates the allowable interference quantity based on the measured interference quantity and the target user capacity. Then, the acceptance control unit compares the measured actual interference quantity with the allowable interference quantity, and judges whether the received request of connecting the lines is to be accepted or refused. Thus, the acceptance control unit controls the acceptance of the request for connecting the lines.

Therefore, the base station can accept the new request of connecting the line (hereinafter, referred to as a "call"), which is transmitted from the terminal equipment, in accordance with the comparison result obtained by comparing the allowable interference quantity that is allowed to maintain the target user capacity with the actual interference quantity. Alternatively, the base station can restrict the acceptance of the request by refusing the call. As a result, the base station can maintain the user capacity, and maintain the communication quality. Furthermore, the allowable interference quantity calculation unit can obtain the allowable interference quantity in accordance with actual situation of the interference by using the actually measured interference quantity and the target user capacity.

DETAILED DESCRIPTION OF THE INVENTION

First Embodiment

Next, a first embodiment of the present invention will be described with reference to the drawings below.

(Communication System)

Figure 1:
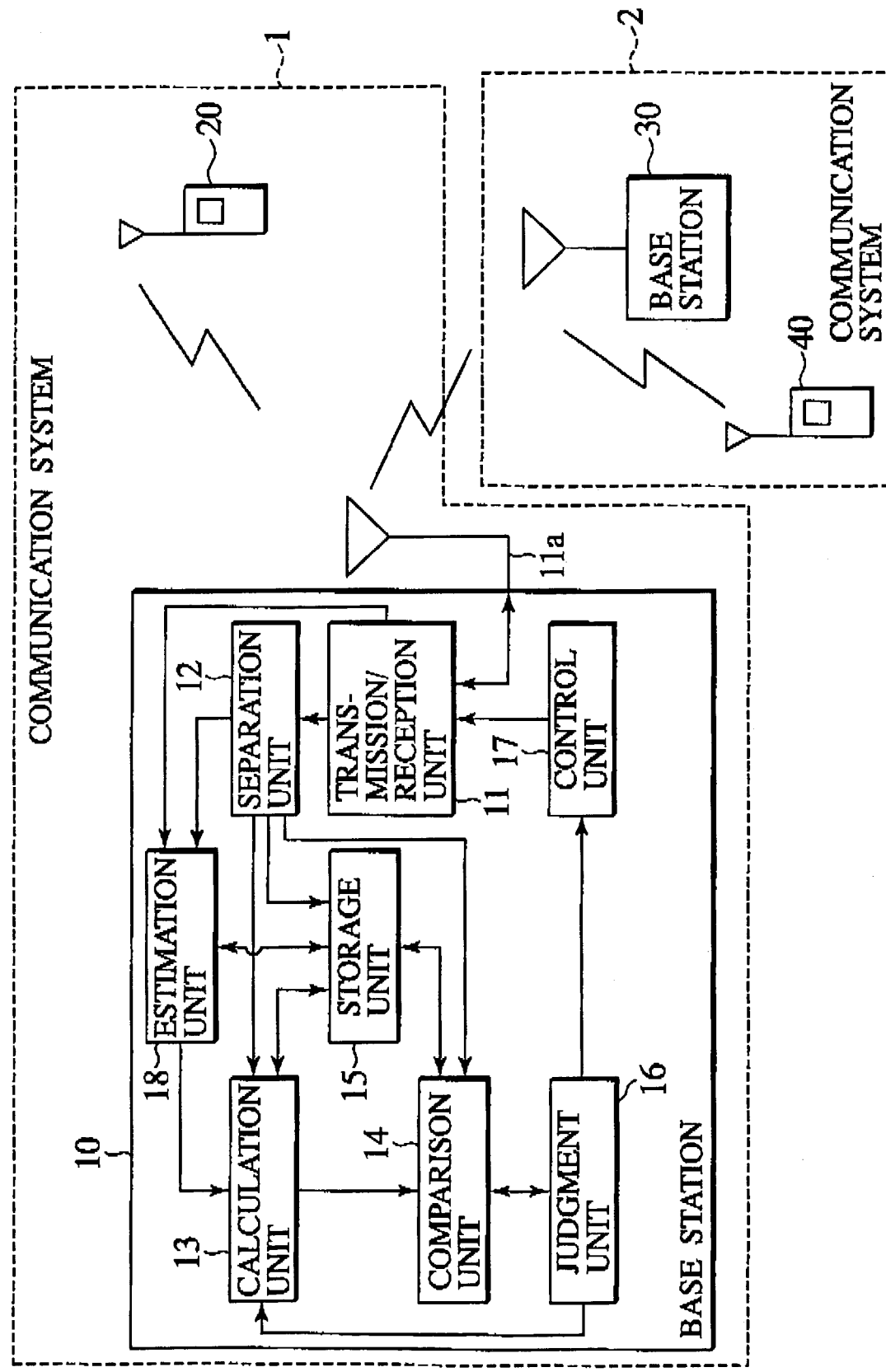
FIG. 1 is a drawing illustrating a configuration of a communication system according to a first embodiment of the present invention.

As shown in FIG. 1, a base station 10 is provided in a communication system 1. In addition, the communication system 1 includes a terminal equipment 20. Although FIG. 1 illustrates only the single base station 10 and the single terminal equipment 20 respectively, the communication system 1, in practice, comprises a plurality of base stations 10 and a plurality of terminal equipments 20.

The base station 10 is provided in the communication system 1. The base station 10 offers communication services provided by the communication system 1 to the terminal equipment 20. To be concrete, the base station 10 connects a line with the terminal equipment 20 to perform a communication with the terminal equipment 20, and offers the communication services. The terminal equipment 20 utilizes the communication services offered by the base station 10. To be concrete, the terminal equipment 20 connects the line with the base station 10 to perform the communication, and utilizes the communication services.

The communication system 1 exists in an environment where the communication system 2 generating an interference wave toward a frequency band used in the communication system 1 exists. As shown in FIG. 1, the communication system 2 as well as the communication system 1 comprises a base station 30 and a terminal equipment 40. A radio wave used in the communication system 2 is the one of a frequency band close to that used by the communication system 1.

Figure 2:
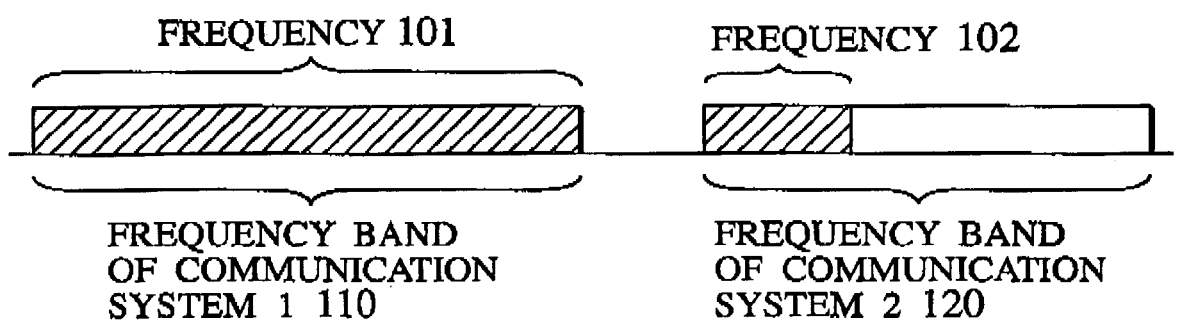
FIG. 2 is a drawing illustrating a relationship of frequency bands between the communication systems according to the first embodiment of the present invention.

For example, the communication system 1 can be configured as a Code Division Multiple Access-Time Division Duplex (CDMA-TTD) communication system using a radio wave of a 1.9 GHz band that is a frequency band close to a Code Division Multiple Access-Frequency Division Duplex (CDMA-FDD) band. Since the CDMA-TDD communication system uses a CDMA system and a TDD system to perform a plural channels communication, it can make transmission/reception timing variable. As shown in FIG. 2, the communication system 1 uses a frequency 101 included in a frequency band 110 of the communication system 1.

On the other hand, the communication system 2 can be configured as an International Mobile Telecommunication-2000 (IMT-2000) type portable telephone system using a radio wave of a 2 GHz band, in which an uplink frequency band is 1.92 to 1.98 GHz band, and a downlink frequency band is 2.11 to 2.17 GHz band. As shown in FIG. 2, a frequency band 120 of the communication system 2 used by the communication system 2 is the one close to the frequency band 110 of the communication system 1.

As described above, the communication system 1 exists in an environment where the communication system 2 using the frequency band 120 close to the frequency band 110 used in the communication system 1 exists. As shown in FIG. 2, when the communication system 2 uses a frequency 102 close to the frequency band 110 of the communication system 1, there is a possibility that the communication system 2 generates an interference wave toward the frequency band 110 used by the communication system 1. Interference wave power includes spurious power and leakage power.

The base station 101 comprises a transmission/reception unit 11, an antenna 11a, a separation unit 12, a calculation unit 13, a comparison unit 14, a storage unit 15, a judgment unit 16, a control unit 17, and an estimation unit 18. The transmission/reception unit 11 functions as a reception unit configured to receive a radio wave containing data and a call (request for connecting a line), which are transmitted by the terminal equipment 20, via the antenna 11a. At this time, the transmission/reception unit 11 receives, via a wireless communication channel, a radio wave containing a desired wave transmitted by the terminal equipment 20 and an interference wave.

The interference wave contains an interference wave from the communication system 2, an interference wave within the communication system 1 and thermal noise. Power of the interference wave from the communication system 2, which is received by the transmission/reception unit 11, that is, an interference quantity from the communication system 2 is hereinafter referred to as an "external interference quantity". In addition, power of the interference wave in the communication system 1, which is received by the transmission/reception unit 11, that is, an interference quantity within the communication system 1 is called as an "intra-system interference quantity". Accordingly, an interference quantity toward the frequency band used by the communication system 1 means a sum of the external interference quantity, the intra-system interference quantity and the thermal noise. Since the transmission/reception unit 11 receives an interference wave containing the interference wave from the communication system 2, the interference wave within the communication system 1 and the thermal noise, its reception power is an interference quantity toward the frequency band used by the communication system 1.

Furthermore, the transmission/reception unit 11 also functions as a transmission unit configured to transmit control information and data to the terminal equipment 20 via the antenna 11a. The control information is required for connecting a line. The transmission/reception unit 11 keeps track of the number of terminal equipments 20, which are connected to the transmission/reception unit 11 and connect lines. Then, the transmission/reception unit 11 inputs the received radio wave and the number of the terminal equipments 20, which connect lines, to the separation unit 12. In addition, the transmission/reception unit 11 acquires timings at which the terminal equipment 20 receives a wireless signal from the base station 10 and the terminal equipment 20 transmits a wireless signal to the base station 10 (hereinafter referred to as "wireless timings of the terminal equipment"), from the terminal equipment 20. Furthermore, timings at which the transmission/reception unit 11 of the base station 10 transmits a wireless signal to the terminal equipment 20 and receives a wireless signal from the terminal equipment 20 are hereinafter referred to as "wireless timings of the base station". Then, the transmission/reception unit 11 inputs the wireless timings of the base station and the acquired wireless timings of the terminal equipment to the estimation unit 18.

The separation unit 12 acquires the radio wave from the transmission/reception unit 11, which is received by the transmission/reception unit 11, and separates the radio wave into a desired wave transmitted by the terminal equipment 20 and an interference wave. The desired wave contains transmission power information indicating a value of transmission power, with which the terminal equipment 20 transmits the radio wave. It is noted that when transmission power, with which the terminal equipment 20 transmits the radio wave, is previously set in the communication system 1 and each base station 10, the desired wave does not need to contain the transmission power information. The separation unit 12 functions as an interference quantity measurement unit configured to measure an interference quantity (reception power of the interference wave) toward the frequency band used in the communication system 1, by separating the radio wave into the desired wave and the interference wave. In addition, the separation unit 12 measures the reception power with which the transmission/reception unit 11 receives the radio wave transmitted from the terminal equipment 20, by separating the radio wave into the desired wave and the interference wave. Then, the separation unit 12 stores the measured interference quantity and the number of the terminal equipments 20 that are connected to the transmission/reception unit 11 to connect lines, in the storage unit 15. The number of the terminal equipments 20 is acquired from the transmission/reception unit 11. In addition, the separation unit 12 inputs them to the calculation unit 13. Furthermore, the separation unit 12 inputs the reception power and the transmission power information, which are transmitted from the terminal equipment 20, to the calculation unit 13, the comparison unit 14 and the estimation unit 18.

The storage unit 15 stores the data. The storage unit 15 stores, for example, the interference quantity measured by the separation unit 12, the target user capacity, a sum of antenna gains of the base station 10 and the terminal equipments 20, which contain cable lose and the like previously determined in the communication system 1, the number of the terminal equipments 20 which are connected to the transmission/reception unit 11 to connect the lines, and the value calculated by the calculation unit 13 such as the external interference quantity. The target user capacity is the target number of the terminal equipments that connect lines as described above. The target user capacity is determined in accordance with a distance from the base station 10, specifically a distance from the transmission/reception unit 11. Furthermore, in the case where the transmission power, with which the terminal equipment 20 transmits the radio wave, is previously set in the communication system 1 and each base station 10, the storage unit 15 also stores the transmission power information relating to the transmission power.

The estimation unit 18 is a distance measurement unit configured to measure a distance between the base station 10 and the terminal equipment 20, more specifically, a distance between the transmission/reception unit 11 and the terminal equipment 20. To be concrete, from the separation unit 12, the estimation unit 18 acquires the reception power, with which the transmission/reception unit 11 of the base station 10 receives the radio wave transmitted from the terminal equipment 20, and the transmission power information indicating the value of the transmission power, with which the terminal equipment 20 transmits the radio wave. In addition, the estimation unit 18 acquires the sum of the antenna gains of the base station 10 and the terminal equipment 20 from the storage unit 15. Then, the estimation unit 18 estimates the distance between the base station 10 and the terminal equipment 20 by calculation based on the above-described data. Thus, the estimation unit 18 measures the distance between the base station 10 and the terminal equipment 20.

The estimation unit 18 first calculates propagation loss "L" between the base station 10 and the terminal equipment 20 by the following equation (1). In the equation (1) "Pr" represents the reception power with which the transmission/reception unit 11 of the base station 10 receives the radio wave transmitted from the terminal equipment 20. "Pi" represents the transmission power, with which the terminal equipment 20 transmits the radio wave. "G" represents the sum of the antenna gains of the base station 10 and the terminal equipment 20.

$$L=(Pi/Pr)\times G \tag{1}$$

Next, the estimation unit 18 calculates the actual distance "r" between the base station 10 and the terminal equipment 20 by a propagation loss equation used. The propagation loss equation is used selectively depending on propagation conditions, in order to obtain the propagation loss. The propagation loss equations are for example a "free space equation" and a "Hata equation. For example, when the free space equation is used as the propagation loss equation, the distance "r" between the base station 10 and the terminal equipment 20 is calculated by the following equation (2) as shown below. Note that "L (dB)" in the equation (2) indicates a logarithm representation of the propagation loss "L".

$$L(dB)=38+20\log r \tag{2}$$

Furthermore, when the wireless communication system 1 uses the TDD system, the estimation unit 18 acquires the wireless timing of the terminal equipment and the wireless timing of the base station from the transmission/reception unit 11. The estimation unit 18 measures a time difference between the wireless timing of the terminal equipment and the wireless timing of the base station. Then, based on the time difference, the estimation unit 18 may measure the distance between the terminal equipment 20 and the base station 10 by estimation the distance.

Figure 3:
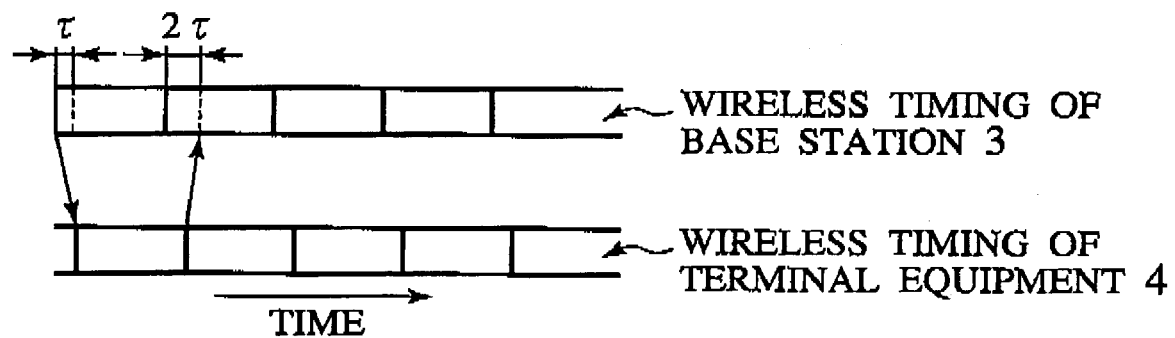
FIG. 3 is a drawing illustrating a relationship between a wireless timing of a base station and a wireless timing of a terminal equipment according to the first embodiment of the present invention.

As shown in FIG. 3, the time difference between the wireless timing 3 of the base station 10 and the wireless timing 4 of the terminal equipment 20 is "τ (sec)". The wireless timing 3 is a timing at which the base station 10 transmits the radio signal to the terminal equipment 20. The wireless timing 4 is a timing at which the terminal equipment 20 receives the radio signal. More specifically, "τ" is a difference between the transmission time of the radio signal and the arrival time thereof, the difference originating from the propagation path length between the base station 10 and the terminal equipment 20. The estimation unit 18 measures the time difference between the first and second times. The first time is a term ranging from the transmission of the radio signal to the terminal equipment 20 by the base station 10 until the reception of the radio signal from the terminal equipment 20 by the base station 10. The second time is a term from the reception of the radio signal from the base station 10 by the terminal equipment 20 until the transmission of the radio signal to the base station 10 by the terminal equipment 20. Specifically, the estimation unit 18 measures the time difference "2τ (sec)" equivalent to a round-trip time difference of the radio signal between the base station 10 and the terminal equipment 20. The estimation unit 18 obtains "τ" by dividing the measured time difference "2τ" by "2". Then, the estimation unit 18 calculates the distance "r" between the bass station 10 and the terminal equipment 20 by the following equation (3).

$$r=\tau\times\text{light velocity} \tag{3}$$

The distance "r" is calculated on the premise that the light velocity in the equation (3) is $3\times10^8$ m/sec. The estimation unit 18 inputs the actual measured distance "r" between the base station 10 and the terminal equipment 20 to the calculation unit 13 in the above described manner.

The calculation unit 13 is an allowable interference quantity calculation unit configured to calculate an allowable interference quantity toward the frequency band 110 of the communication system 1, which is allowed to maintain the target user capacity. The calculation unit 13 calculates the allowable interference quantity based on the measured interference quantity and the determined target user capacity. To be concrete, the calculation unit 13 calculates the external interference quantity by using the measured interference quantity. Furthermore, the calculation unit 13 acquires the target user capacity from the storage unit 15. Then, the calculation unit 13 calculates the allowable interference quantity based on the external interference quantity, which is calculated by using the measured interference quantity, and the target user capacity. Therefore, the calculation unit 13 also functions as an external interference quantity calculation unit configured to calculate the external interference quantity. Furthermore, the calculation unit 13 also functions as a distance threshold value calculation unit configured to calculate a threshold value of the distance between the terminal equipment 20 and the base station 10, which is for refusing the call from the terminal equipment 20.

First, descriptions will be made for the case where the calculation unit 13 functions as the external interference quantity calculation unit. At the point when the transmission/reception unit 11 receives the interference wave, the calculation unit 13 calculates the intra-system interference quantity at that point based on the number of the terminal equipments 20 connected to the transmission/reception unit 11 to connect the lines with the base station 10 at the point, and the reception power with which the base station 10 receives the radio wave from one terminal equipment 20. From the separation unit 12, the calculation unit 13 acquires the number of the terminal equipments 20 connected to the base station 10 and the reception power of the radio wave from the terminal equipment 20. Then, the calculation unit 13 calculates the intra-system interference quantity by using the following equations (4) and (5). Note that "Pr" in the equations (4) and (5) represents the reception power from one terminal equipment 20. "R" represents a data rate. "Eb" represents signal energy per one bit. "C" represents the number of the terminal equipments 20 that are connected to the transmission/reception unit 11 to connect the lines with the base station 10. "pg" represents a spreading rate.

$$Pr=Eb\times R \tag{4}$$

$$\text{Intra-system interference quantity}=(C/pg)\times Eb \tag{5}$$

For example, in the case, which the data rate is 64 kbps, 64000 bps is substituted to the equation (4) as the data rate. Furthermore, the spreading rate "pg" is a constant value previously determined in the communication system 1. The calculation unit 13 obtains the signal energy per one bit "Eb" by substituting the data rate "R" and the reception power "Pr" from one terminal equipment 20 to the equation (4). Next, the calculation unit 13 substitutes the acquired number "C" of the terminal equipments 20 connecting the lines, the determined spreading rate "pg", and the signal energy "Eb" per one bit, which is calculated by the equation (4), to the equation (5). Thus, the calculation unit 13 calculates the intra-system interference quantity.

Herein, the interference quantity is represented by the following equation (6). Note that "$N_0$" in the equation (6) represents the thermal noise, and "Is" represents the external interference quantity.

$$\text{Interference quantity}=N_0+(C/pg)\times Eb+Is \tag{6}$$

The thermal noise "$N_0$" is a constant value in the equation (6). Accordingly, the calculation unit 13 subtracts the thermal noise "$N_0$" and the obtained intra-system interference quantity "(C/pg)×Eb" at the point when the transmission/reception unit 11 receives the interference wave from the acquired measurement value of the interference quantity. Thus, the calculation unit 13 obtains the difference between the interference quantity and the sum of the intra-system interference quantity and the thermal noise "$N_0$". In this manner the calculation unit 13 calculates the external interference quantity "Is". The calculation unit 13 uses the calculated external interference quantity for the calculation of the allowable interference quantity. In addition, the calculation unit 13 stores the calculated external interference quantity in the storage unit 15.

Next, description will be made of the case where the calculation unit 13 functions as the allowable interference quantity calculation unit and the distance threshold value calculation unit. The calculation unit 13 calculates the allowable interference quantity based on the target user capacity and the external interference quantity obtained by the calculation using the measured interference quantity. At this time, the calculation unit 13 calculates the allowable interference quantity and the distance threshold value by the simulation performed according to the following procedure.

The distance threshold value is a value used as the following standard. Specifically, when the external interference quantity exceeds the allowable interference quantity and the base station 10 comes to be incapable of maintaining the target user capacity, the base station 10 restricts the acceptance of the call from the terminal equipment 20 located near the base station 10, and accepts the call from the terminal equipment 20 located at the edge of the wireless area. For this reason, the distance threshold value is determined as value capable of equalizing the density distribution of the terminal equipments 20 connecting the lines with the base station 10 and maintaining the user capacity in the wireless area equally, by judging that the terminal equipment 20 is located near the base station 10 and refusing the acceptance of the call, when the distance becomes equal to the distance threshold value or less.

Figure 4:
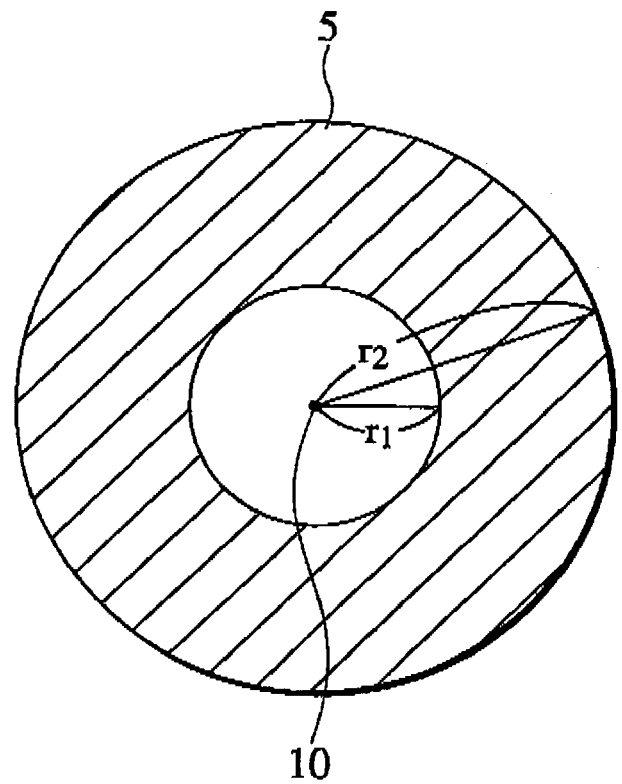
FIG. 4 is a drawing illustrating a wireless area used for a simulation according to the first embodiment of the present invention.

FIG. 4 is a drawing illustrating the wireless area 5 used for the simulation. As shown in FIG. 4, the base station 10 covers the wireless area 5, and performs the communication with the terminal equipment 20 existing in the wireless area 5. The longest distance among distances from the base station 10 to the wireless area 5 is the maximum area length "$r_2$". In addition, the distance threshold value is "$r_1$". The calculation 13 acquires the distance between the base station 10 and the terminal equipment 20 from the estimation unit 18. The terminal equipment 20 exists in the wireless area 5 and has already connected the line with the base station 10. Then, the calculation unit 13 disposes the terminal equipment 20 in the wireless area 5 based on the distance between the terminal equipment 20 and the base station 10 acquired from the estimation unit 18. This terminal equipment 20 has already existed within the wireless area 5.

Next, the calculation unit 13 distributes equally the terminal equipments 20, which are going to be connected to the base station 10, in the wireless area 5. To be concrete, the calculation unit 13 disposes the terminal equipments 20 in the wireless area 5 one by one, in addition to the terminal equipments 20 that have already existed in the wireless area 5. The calculation unit 13 calculates the transmission power of each terminal equipment 20 every time the calculation unit 13 disposes one terminal equipment 20. The intra-system interference quantity "(C/pg)×Eb" increases every time the terminal equipment 20 increases by one, and the transmission power of each terminal equipment 20 which has already been in the wireless area 5 also increases.

Furthermore, the calculation unit 13 disposes the terminal equipments 20 equally within the range from the maximum area length "$r_2$" to the distance threshold value "$r_1$" in the wireless area 5, until the user capacity achieves the target user capacity determined in accordance with the distance from the base station 10. At this time, in consideration for the number of the terminal equipments 20 which has already been disposed in the wireless area 5, the distance threshold value "$r_1$" is determined so that the range from the maximum area length "$r_2$" to the distance threshold value "$r_1$" is a range satisfying the target user capacity which is determined in accordance with the distance from the base station 10. In this manner, the calculation unit 13 obtains the distance threshold value "$r_1$", so that the user capacity becomes equal to the target user capacity by using the number of the terminal equipments 20 which are going to be connected to the base station 10. The calculation unit 13 stores the obtained distance threshold value "$r_1$" in the storage unit 15.

Thereafter, the calculation unit 13 disposes the terminal equipments 20 uniformly in the range of the wireless area 5 from the distance threshold value "$r_1$" to the base station 10. Then, at the point when the transmission power of any of the terminal equipments 20 disposed in the wireless area 5 exceeds the maximum transmission power previously determined, the calculation unit 13 ends to dispose the terminal equipments 20. Note that the maximum transmission power of the terminal equipment 20 is equal to the maximum power that the base station 10 can receive from the terminal equipment 20.

Next, the calculation unit 13 calculates the signal energy "Eb" per one bit by the following equations (7) and (8). In the equation (8), "Pt" is the transmission power of the terminal equipment 20.

$$Pr=Pt\times(G/L) \quad (7)$$

$$Eb=Pr/R \quad (8)$$

The calculation unit 13 substitutes the transmission power of the terminal equipment 20 immediately before it exceeds the maximum transmission power for "Pt" of the equation (7). In addition, the calculating unit 13 calculates the propagation loss "L" by using the equation (1), and acquires the sum of the antenna gains "G" of the base station 10 and the terminal equipment 20 from the storage unit 15. Next, the calculation unit 13 substitutes the reception power "Pr" obtained by the equation (7) and the data rate "R" to the equation (8), and calculates the signal energy per one bit "Eb".

The calculation unit 13, by the equation (9), calculates the maximum user capacity "Cmax" that can exist in the range from the maximum area length "$r_2$" to the distance threshold value "$r_1$". In other words, the calculation unit 13 calculates the maximum user capacity obtained in accordance with the distance from the base station 10. Note that in the equation (9), "(Eb/$I_0$) req" means "required Eb/$I_0$", and is a constant value previously determined in the communication system 1. "$I_0$" represents the interference quality toward the frequency band 110 used by the communication system 1.

$$(Eb/I_0)\text{req}=Eb/\{N_0+(Cmax/pg)\times Eb+Is\} \quad (9)$$

The calculation unit 13 calculates the maximum user capacity "Cmax" that can exist in the range from the maximum area length "$r_2$" to the distance threshold value "$r_1$", by substituting the obtained signal energy per one bit "Eb", "required Eb/$I_0$" that is the constant value, the thermal noise "$N_0$", the spreading rate "pg", and the obtained external interference quantity "Is", to the equation (9). Finally, the calculation unit 13 calculates the allowable interference quantity by the following equation (10).

$$\text{Allowable interference quantity} = N_0 + (C\max/pg) \times Eb + Is \quad (10)$$

The calculation unit 13 calculates the allowable interference quantity by substituting the obtained maximum user capacity "Cmax", the signal energy per one bit "Eb", the external interference quantity "Is", the thermal noise "$N_0$", and the spreading rate "pg" to the equation (10). The calculation unit 13 inputs the calculated allowable interference to the comparison unit 14. In the above described manner, the calculation unit 13 calculates the maximum user capacity "Cmax" obtained in accordance with the distance from the base station 10, by using the external interference quantity obtained from the measured interference quantity and the target user capacity. Thus, the calculation unit 13 calculates the allowable interference quantity.

Furthermore, as described above, in the range from the maximum area length "$r_2$" to the distance threshold value "$r_1$" in the wireless area 5, the calculation unit 3 disposes the terminal equipments 20 equally up to the target user capacity which is determined in accordance with the distance from the base station 10. Thereafter, the calculation unit 13 disposes the terminal equipments 20 equally in the range from the distance threshold value "$r_1$" to the base station 10 in the wireless area 5. Then, the calculation unit 13 continues to dispose the terminal equipments 20 until the transmission power of any of the terminal equipments 20 disposed in the wireless area 5 exceeds the previously determined maximum transmission power. Subsequently, the calculation unit 13 substitutes the transmission power of the terminal equipment 20 for "Pt" of the equation (7). This transmission power is the one immediately before exceeding the maximum transmission power. Therefore, the allowable interference quantity can be obtained by calculating the maximum user capacity "Cmax" that can exist in the range from the maximum area length "$r_2$" to the distance threshold value "$r_1$". As a result, the base station 10 can maintain the maximum user capacity.

Note that the calculation unit 13 may finish to dispose the terminal equipments 20 when the terminal equipments 20 are disposed equally up to the target user capacity. And the calculation unit 13 may substitute the transmission power of the terminal equipment 20, at the point when the terminal equipments 20 are disposed up to the target user capacity, for "Pt" of the equation (7) to obtain the allowable interference quantity.

In addition, the calculation unit 13 functions also as a target user capacity determination unit configured to determine the target user capacity. To be concrete, by the calculation and the simulation, the calculation unit 13 previously obtains the user capacity in accordance with the distance from the base station 10, which corresponds to the external interference quantity. Specifically, the calculation unit 13 previously obtains the relation between the external interference quantity and the density distribution of the terminal devises 20 in the wireless area covered by the base station 10. Then, the calculation unit 13 determines the target user capacity in accordance with the distance from the base station 10 based on the obtained relation between the external interference quantity and the density distribution of the terminal equipments 20 in the wireless area covered by the base station 10. The calculation unit 13 stores the determined target user capacity, in the storage unit 15. Note that the target user capacity may be determined only for a region at the edge of the wireless area, which is liable to be influenced by the interference. Then, the calculation unit 13 may calculate by using the target user capacity determined for the region at the edge of the wireless area, when it obtains the allowable interference quantity and the distance threshold value.

Furthermore, the calculation unit 13 also function as a reception power threshold value calculation unit configured to calculate a threshold value of the reception power used for refusing the call from the terminal equipment 20 (hereinafter referred to as a "reception level threshold value"). The reception level threshold value is used when each of the terminal equipments 20 transmit a call with the maximum transmission power at that point without performing a control of the transmission power, and the reception power values of the calls from terminal equipments 20 received by the transmission/reception unit 11 of the base station 10 vary. In this case, the reception power threshold value is a standard value used in the following manner. Specifically, the reception power of the call from the terminal equipment 20 is large, and hence the call from the terminal equipment 20 considered to be located near the base station 10 is refused. Furthermore, the reception power of the call is small, and hence the call from the terminal equipment 20 considered to be located at the edge of the wireless area is accepted. For this reason, the reception level threshold value determined as a value capable of equalizing the density distribution of the terminal equipments 20 connecting the lines with the base station 10 and maintaining the user capacity in the wireless area equally, by judging the terminal equipment 20 is located near the base station 10 and by refusing the acceptance of the call, when the reception power becomes equal to the reception level threshold value or more.

Furthermore, the calculation unit 13 functions as a transmission power threshold value calculation unit configured to calculate a threshold value of the transmission power for refusing the call from the terminal equipment 20 (hereinafter referred to as a "transmission level threshold value"). The transmission level threshold value is used in the case where the terminal equipments 20 perform the transmission power control, and the reception power values of the calls received by the transmission/reception unit 11 of the base station 10 are equal for any of the terminal equipments 20. In this case, the transmission level threshold value is a standard value used in the following manner. Specifically, the transmission power of the call from the terminal equipment 20 is small, and hence the call from the terminal equipment 20 considered to be located near the base station 10 is refused. Furthermore, the transmission power of the call is large, and hence the call from the terminal equipment 20 considered to be located at the edge of the wireless area is accepted. For this reason, the transmission level threshold value is determined as a value capable of equalizing the density distribution of the terminal equipments 20 connecting the lines with the base station 10 and maintaining the user capacity in the wireless area equally, by judging the terminal equipment 20 is located near the base station 10 and refusing the acceptance of the call, when the transmission power becomes equal to the transmission level threshold value or less. Note that the transmission power control is to control the transmission power of the terminal equipment 20 so that the reception power values with which the transmission/reception unit 11 receives the radio waves from all of the terminal equipments 20 become constant. The transmission power control is performed in order to solve the problem caused by the difference of the distance between the base station 10 and each terminal equipment 20, in which the radio wave transmitted from the terminal equipment 20 located at the edge of the wireless area is buried in the radio wave transmitted from the terminal equipment 20 located near the base station 10.

To be concrete, the calculation unit 13 calculates the reception level threshold value and the transmission level threshold value based on the distance threshold value "$r_1$" obtained in the above described manner, when the external interference quantity exceeds the allowable interference quantity and hence it become impossible to maintain the target user capacity. The calculation unit 13 calculates the reception level threshold value and the transmission level threshold value by following the instruction of the judgment unit 16. The calculation unit 13 acquires the distance threshold value "$r_1$" from the storage unit 15. Then, the calculation unit 13 calculates the propagation loss "L" based on the distance threshold value "$r_1$" by using the propagation loss equation used. For example, when the free space equation is used as the propagation loss equation, the calculation unit 13 substitutes the distance threshold value "$r_1$" for the distance "r" between the base station 10 and the terminal equipment 20 in the above-described equation (2), and obtains the propagation loss "L".

Next, when the terminal equipment 20 does not perform the transmission power control and the reception power values of the radio waves from the terminal equipments 20 received by the transmission/reception unit 11 of the base station 10 vary, the calculation unit 13 substitutes the transmission power, with which the terminal equipment 20 transmits the radio wave, for "Pi" of the above described equation (1). Note that when the calculation unit 13 receives the transmission power information transmitted from the terminal equipment 20, the calculation unit 13 acquires the transmission power from the separation unit 12. And when the transmission power is previously determined, the calculation unit 13 acquires the transmission power from the storage unit 15.

Furthermore, the calculation unit 13 calculates the reception power "Pr", with which the base station 10 receives the radio wave transmitted by the terminal equipment 20, by substituting the calculated propagation loss "L" and the acquired sum of the antenna gains "G" of the base station 10 and the terminal equipment 20, to the equation (1). Then, as the reception level threshold value, the calculation unit 13 determines the reception power "Pr" obtained based on the distance threshold value "$r_1$". The calculation unit 13 stores the calculated reception level threshold value in the storage unit 15.

On the other hand, when the terminal equipment 20 performs the transmission power control and the reception power values of the radio waves from the terminal equipments 20, received by the transmission/reception unit 11 of the base station 10 are equal, the calculation unit 13 substitutes the reception power, with which the transmission/reception unit 11 of the base station 10 received the radio wave transmitted from the terminal equipment 20, for "Pr" of the above-described equation (1). Furthermore, the calculation unit 13 calculates the transmission power "Pi" corresponding to the distance threshold value "$r_1$", with which the terminal equipment 20 transmitted the radio wave by substituting the calculated propagation loss and the acquired sum of the antenna gains "G" of the base station 10 and the terminal equipment 20, to the equation (1). Then, the calculation unit 13 determines, as the transmission level threshold value, the transmission power "Pi" obtained based on the distance threshold value "$r_1$". The calculation unit 13 stores the calculated transmission level threshold value in the storage unit 15.

The comparison unit 14 compares the interference quantity measured by the separation unit 12 with the allowable interference quantity calculated by the calculation unit 13. The storage unit 14 acquires the interference quantity measured by the separation unit 12 from the storage unit 15, and acquires the allowable interference quantity calculated by the calculation unit 13 from the calculation unit 13. The comparison unit 14 compares the interference quantity with the allowable interference quantity. To the judgment unit 16, the comparison unit 14 inputs the comparison result as to whether or not the interference quantity is equal to the allowable interference quantity or less.

Furthermore, when the terminal equipment 20 does not perform the transmission power control and the reception power values of the calls from terminal equipments 20 received by the transmission/reception unit 11 of the base station 10 vary, the comparison unit 14 compares the reception level threshold value with the reception power of the call newly received from the terminal equipment 20. The comparison unit 14 follows the instruction of the judgment unit 16 to acquire the reception power of the call, which is measured by the separation unit 12, from the separation unit 12. The comparison unit 14 acquires the reception level threshold value from the storage unit 15. The comparison unit 14 compares the actual reception power of the call with the reception level threshold value. Then, to the judgment unit 16, the comparison unit 14 inputs the comparison result as to whether or not the reception power of the call is equal to the reception level threshold value or less.

Furthermore, when the terminal equipment 20 performs the transmission power control and the reception power values of the radio waves from terminal equipments 20 received by the transmission/reception unit 11 of the base station 10 are equal, the comparison unit 14 compares the transmission power of the call newly transmitted by the terminal equipment 20 with the transmission level threshold value. The comparison unit 14 follows the instruction of the judgment unit 16 to acquire the transmission power information, which indicates the value of the transmission power of the call, from the separation unit 12. The comparison unit 14 further acquires the transmission level threshold value from the storage unit 15. The comparison unit 14 compares the actual transmission power of the call with the transmission level threshold value. Then, to the judgment unit 16, the comparison unit 14 inputs the comparison result as to whether or not the transmission power of the call is equal to the transmission level threshold value or less.

The judgment unit 16 acquires the comparison result from the comparison unit 14, which is obtained by comparing the interference quantity with the allowable interference quantity. Based on the comparison result of the interference quantity with the allowable interference quantity acquired from the comparison unit 14, the judgment unit 16 judges whether or not the base station 10 executes the restriction on the acceptance of the call from the terminal equipment 20. When the comparison result is that the interference quantity is equal to the allowable interference quantity or less, the judgment unit 16 judges that the target user capacity is satisfied, and determines not to execute the restriction on the acceptance of the call. On the other hand, in the case where the comparison result is that the interference quantity is more the allowable interference quantity, the judgment unit 16 determines to execute the restriction on the acceptance of the call.

When the judgment unit 16 determines to execute the restriction on the acceptance of the call, the judgment unit 16 instructs the calculation unit 14 to calculate the reception level threshold value and the transmission level threshold value, and instructs the comparison unit 14 to compare the reception power of the call newly received from the terminal equipment 20 with the reception level threshold value, or compare the transmission power of the call newly transmitted by the terminal equipment 20 with the transmission level threshold value.

Furthermore, the judgment unit 16 acquires the comparison result, which is obtained by comparing the actual reception power of the call with the reception level threshold value by the comparison unit 14, from the comparison unit 14. The judgment unit 16 acquires another comparison result, which is obtained by comparing the actual transmission power of the call with the transmission level threshold value by the comparison unit 14, from the comparison unit 14. Based on the comparison result of the reception power of the call with the reception level threshold value, which is acquired from the comparison unit 14, or the comparison result of the transmission power of the call with the transmission level threshold value, which is acquired from the comparison unit 14, the judgment unit 16 judges whether or not the base station 10 executes the restriction on the acceptance of the call from the terminal equipment 20.

In the case where the terminal equipment 20 does not perform the transmission power control and the reception power values of the calls from terminal equipments 20 received by the transmission/reception unit 11 of the base station 10 vary, when the comparison result is that the actual reception power of the call is less than the reception level threshold value, the judgment unit 16 judges that the terminal equipment 20 is located at the edge of the wireless area, and determines not to execute the restriction on the acceptance of the new call from the terminal equipment 20. When the comparison result is that the actual reception power of the call is equal to the reception level threshold value or more, the judgment unit 16 judges that the terminal equipment 20 is located near the base station 10, and determines to execute the restriction on the acceptance of the new call from the terminal equipment 20.

On the other hand, in the case where the terminal equipment 20 performs the transmission power control and the reception power values of the radio waves from the terminal equipments 20 received by the transmission/reception unit 11 of the base station 10 are equal, when the comparison result is that the actual transmission power of the call is more than the transmission level threshold value, the judgment unit 16 Judges the terminal equipment 20 to be located at the edge of the wireless area, and determines not to execute the restriction on the acceptance of the new call from the terminal equipment 20. When the comparison result is that the actual transmission power of the call is equal to the transmission level threshold value or less, the judgment unit 16 judges that the terminal equipment 20 is located near the base station 10, and determines to execute the restriction on the acceptance of the new call from the terminal equipment 20. To the control unit 17, the judgment unit 16 inputs the determination result as to whether or not the base station 10 executes the restriction on the acceptance of the call from the terminal equipment 20.

The control unit 17 acquires, from the judgment unit 16, the determination result as to whether or not the base station 10 executes the restriction on the acceptance of the call from the terminal equipment 20. The control unit 17 executes the restriction on the acceptance of the call from the terminal equipment 20, based on the determination result acquired from the determination unit 16. To be concrete, the control unit 17 normally accepts the call from the terminal equipment 20 which the restriction on the acceptance of the new call is determined not to be executed. And the control unit 17 controls the transmission/reception unit 11 so that the base station 10 connects with the terminal equipment 20 to connect the line. On the other hand, the control unit 17 refuses the acceptance of the call from the terminal equipment 20 which the restriction on the acceptance of the new call is determined to be executed, and restricts the acceptance of the new call. And the control unit 17 controls the transmission/reception unit 11 so that the base station 10 does not connect with the terminal equipment 20 to connect the line.

As described above, the comparison unit 14 compares the interference quantity with the allowable interference quantity. The comparison unit 14 compares the reception power of the call with the reception level threshold value. The comparison unit 14 compares the transmission power of the call with the transmission level threshold value. Based on the comparison result of the interference quantity with the allowable interference quantity, the comparison result of the reception power of the call with the reception level threshold value, and the comparison result of the transmission power of the call with the transmission level threshold value, the judgment unit 16 determines whether or not the base station 10 executes the restriction on the acceptance of the call. Furthermore, the control unit 17 executes the control the acceptance of the call from the terminal equipment 20 based on the determination result by the judgment unit 16. The comparison unit 14, the judgment unit 16 and the control unit 17 function as an acceptance control unit which compares the interference quantity with the allowable interference quantity, and controls the acceptance of the call from the terminal equipment 20 received by the transmission/reception unit 11 based on the reception power and transmission power of the call.

(Communication Method)

Figure 5:
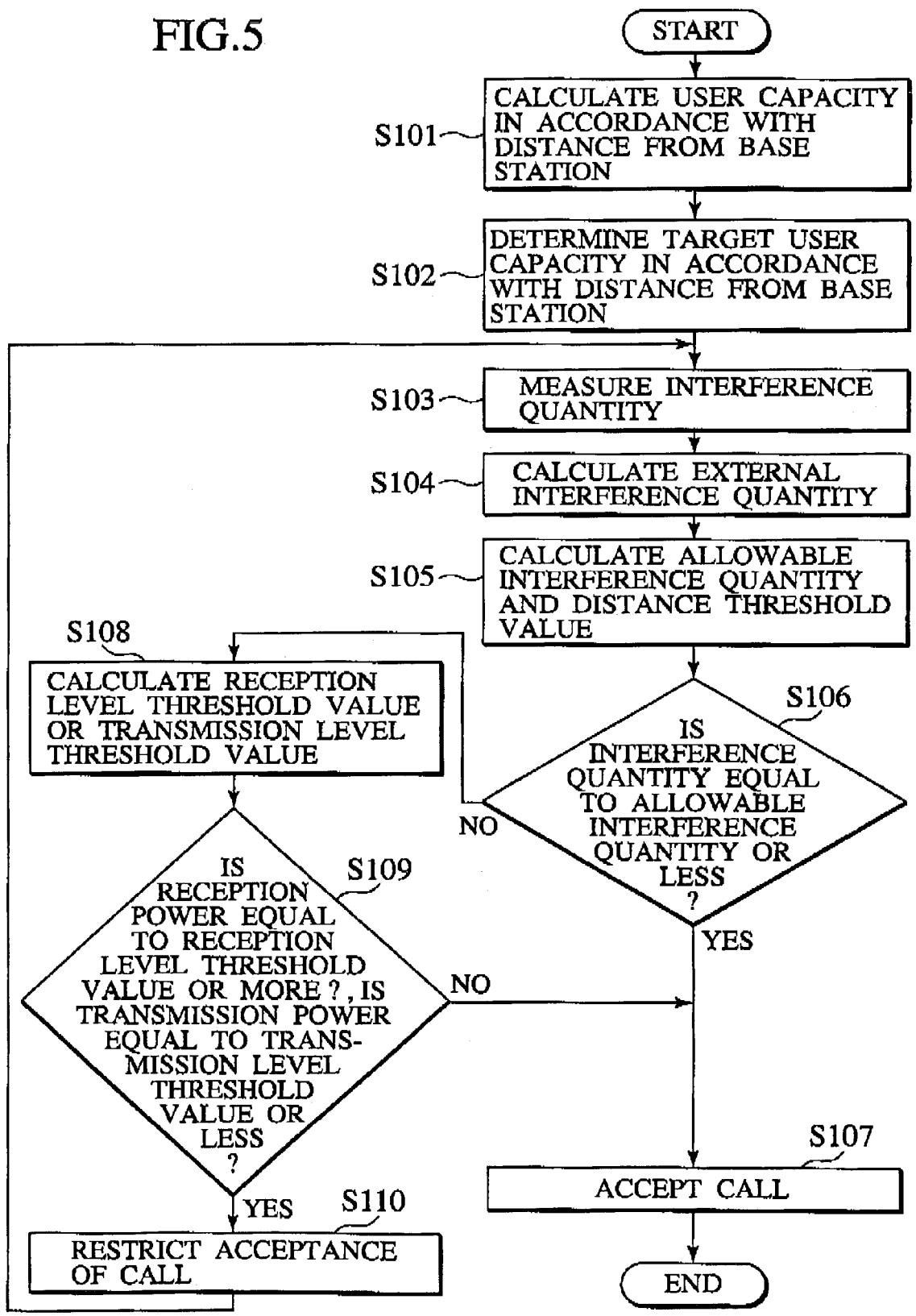
FIG. 5 is a flowchart illustrating a procedure of a communication method according to the first embodiment of the present invention.

Next, a communication method performed by using the communication system 1 will be described. As shown in FIG. 5, the calculation unit 13 calculates the user capacity in accordance with the distance from the base station 10, which corresponds to the external interference quantity (S101). Specifically, the calculation unit 13 obtains the relation between the external interference quantity and the density distribution of the terminal equipments 20 in the wireless area covered by the base station 10. Based on the relation between the external interference quantity and the density distribution of the terminal equipments 20 in the wireless area, the calculation unit 13 determines the target user capacity in accordance with the distance from the base station 10 (S102).

The transmission/reception unit 11 receives the radio wave containing the desired wave from the terminal equipment 20 and the interference wave. The separation unit 12 measures the interference quantity by separating the radio wave received into the desired wave from the terminal equipment 20 and the interference wave (S103). Next, the calculation unit 13 calculates the intra-system interference quantity by using the number of the terminal equipments 20, which are connected to the transmission/reception unit 11 to connect the lines. The calculation unit 13 obtains the difference between the interference quantity and the sum of the intra-system interference quantity and the thermal noise. In this manner, the calculation unit 13 calculates the external interference quantity (S104). The calculation unit 13 calculates the maximum user capacity "Cmax" obtained in accordance with the distance from the base station 10, by using the obtained external interference quantity and the target user capacity. Thus the calculation unit 13 calculates the allowable interference quantity. Furthermore, at this time, in consideration for the target user capacity determined in accordance with the distance from the base station 10 and the number of the terminal equipments 20 that have been already disposed, the calculation unit 13 obtains the distance threshold value "$r_1$", so that the user capacity becomes equal to the targeted user capacity by using the number of the terminal equipments 20 which are going to be connected to the base station 10 (S105).

The comparison unit 14 compares the interference quantity measured by the separation unit 12 with the allowable interference quantity calculated by the calculation unit 13, and inputs the comparison result to the judgment unit 16 (S106). In step (S106), when the comparison result is that the interference quantity is equal to the allowable interference quantity or less, the judgment unit 16 judges that the target user capacity is satisfied, and determines to execute the restriction on the acceptance of the call. Then, the judgment unit 16 inputs the determination result to the control unit 17. When the control unit 17 acquires, from the judgment unit 16, the determination result is that the base station 10 dose not execute the restriction on the acceptance of the call from the terminal equipment 20, the control unit 17 controls the transmission/reception unit 11 so that the transmission/reception unit 11 accepts the call from the terminal equipment 20 normally. Then, the transmission/reception unit 11 accepts the call, and connects the channel with the terminal equipment 20 (S107).

On the other hand, in step (S106), when the comparison result is that the interference quantity has been more than the allowable interference quantity, the judgment unit 16 determines to execute the restriction on the acceptance of the call. Then, the judgment unit 16 instructs the calculation unit 13 to calculate the reception level threshold value or the transmission level threshold value. Furthermore, the judgment unit 16 instructs the comparison unit 14 to compare the reception power of the call newly received from the terminal equipment 20 with the reception level threshold value, or to compare the transmission power of the call newly transmitted by the terminal equipment 20 with the transmission level threshold value. Then, the calculation unit 13 calculates the reception level threshold value or the transmission level threshold value based on the distance threshold value "$r_1$" (S108).

The comparison unit 14 acquires the measured reception power from the separation unit 12. The comparison unit 14 compares the reception power of the call newly received from the terminal equipment 20 with the reception level threshold value, and inputs the comparison result to the judgment unit 16. Alternatively, the comparison unit 14 acquires the transmission power information indicating the value of the transmission power of the call from the separation unit 12. And the comparison unit 14 compares the transmission power of the call newly transmitted by the terminal equipment 20 with the transmission level threshold value, and inputs the comparison result to the judgment unit 16 (S109).

Note that in steps (S108, S109), whether the reception level threshold value is to be calculated to compare the reception power of the call with the reception level threshold value, or the transmission level threshold value is to be calculated to compare the transmission power of the call with the transmission level threshold value is determined depending upon whether or not the terminal devise 20 performs the transmission power control. In the communication system 1, when the terminal equipment 20 transmits the call with the maximum transmission power at that point without performance of the transmission power control, the comparison of the reception power of the call with the reception level threshold value is performed. On the other hand, in the communication system 1, when the terminal equipment 20 performs the transmission power control, the comparison of the transmission power of the call with the transmission level threshold value is performed.

In step (S109), when the comparison result by the comparison unit 14 is that the reception power of the call is equal to the reception level threshold value or more, or when the comparison result by the comparison unit 14 is that the transmission power of the call is equal to the transmission level threshold value or less, the judgment unit 16 judges that the terminal equipment 20 is located near the base station 10. Then, the judgment unit 16 determines to execute the restriction on the acceptance of the new call from the terminal equipment 20. The judgment unit 16 inputs the determination result to the control unit 17. When the control unit 17 acquires the determination result that the base station 10 executes the restriction on the acceptance of the new call, the control unit 17 refuses the call from the terminal equipment 20. Thus the control unit 17 restricts the acceptance of the call. Furthermore, the control unit 17 controls the transmission/reception unit 11 so that the transmission/reception unit 11 does not connect the line with the terminal equipment 20 (S110). Thereafter, the procedure returns to step (S103) and the base station 10 measures the interference quantity, and performs the control for the acceptance of the call.

On the other hand, in step (S109), when the comparison result by the comparison unit 14 is that the actual reception power of the call is less than the reception level threshold value, or comparison result by the comparison unit 14 is that the actual transmission power of the call is more than the transmission level threshold value, the judgment unit 16 judges that the terminal equipment 20 is located at the edge of wireless area. Then, the judgment unit 16 determines not to execute the restriction on the acceptance of the new call from the terminal equipment 20. Then, the judgment unit 16 inputs the determination result to the control unit 17. When the control unit 17 acquires the determination result that the base station 10 dose not execute the restriction on the acceptance of the new call from the terminal equipment 20, the control unit 17 controls the transmission/reception unit 11 so that the transmission/reception unit 11 normally accepts the call from the terminal equipment 20 (S107).

According to the base station 10 and the communication method as described above, the transmission/reception unit 11 receives the interference wave toward the frequency band 110 used in the communication system 1 in which the base station 10 is provided. And the separation unit 12 measures the interference quantity. Furthermore, the calculation unit 13 calculates the allowable interference quantity toward the frequency band 110, which is allowed for maintaining the target user capacity. At this time, the calculation unit 13 calculates the allowable interference quantity based on the measured interference quantity and the target user capacity. Then, the comparison unit 14 compares the interference quantity measured by the separation unit 12 with the allowable interference quantity calculated by the calculation unit 13. Based on the comparison result, the judgment unit 16 judges whether or not the base station 10 restricts the acceptance of the call from the terminal equipment 20, which the transmission/reception unit 11 receives, and the control unit 17 controls the acceptance of the call.

Therefore, the base station 10 can accept and restrict the call from the terminal equipment 20, in accordance with the comparison result of the allowable interference quantity allowed to maintain the target user capacity with the actual interference quantity. As a result, the base station 10 can maintain the user capacity and the communication quality. Furthermore, the calculation unit 13 can obtain the allowable interference quantity in accordance with the actual interference state, based on the target user capacity and the external interference quantity obtained from the interference quantity actually measured by the separation unit 12. Therefore, the base station 10 can maintain the target user capacity.

Particularly, in the process for determining the allowable interference quantity, the calculation unit 13 determines the allowable interference quantity so that the base station 10 achieve the target user capacity, by obtaining the target user capacity in accordance with the distance from the base station 10 and the number of the terminal equipments 20 currently connected to the base station 10 in accordance with the distance from the base station 10. Then, the comparison unit 14, the judgment unit 16 and the control unit 17 control the acceptance of the call by comparing the allowable interference quantity with the interference quantity. Therefore, the base station 10 can make the number of the terminal equipments 20 connected thereto as close as possible to the target user capacity.

Furthermore, in the case where the terminal equipment 20 does not perform the transmission power control and the reception power values of the calls from terminal equipments 20 received by the transmission/reception unit 11 vary, when the interference quantity is more than the allowable interference quantity, the comparison unit 14, the judgment unit 16 and the control unit 17 control the acceptance of the call based on the reception power of the call received by the transmission/reception unit 11. Therefore, by refusing the call from the terminal equipment 20 which shows the large reception power of the call and is considered to be located near the base station 10, the control unit 17 can restrict this call. Furthermore, the control unit 17 can accept the call from the terminal equipment 20, which shows the small reception power of the call and is considered to be located at the edge of the wireless area. Specifically, by refusing the call from the terminal equipment 20 located near the base station 10, which is easy to connect the line with the base station 10, the control unit 17 can restrict the call. The control unit 17 can accept the call from the terminal equipment 20 located at the edge of the wireless area, which is hard to connect the line with the terminal equipment 20.

As a result, the base station 10 can prevent occurrence of a situation that the terminal equipments 20 which communicate with the base station 10 concentrate near the base station 10, and substantial user capacity at the edge of the wireless area covered by the base station 10 decreases, due to an increase of the interference. Thus, the base station 10 can maintain the user capacity at the edge of the wireless area. Therefore, the density distribution of the terminal equipments 20 connecting the lines with the base station 10, which is liable not to be uniform by influence of the interference wave from the communication system 2, can be made uniform. And the base station 10 can maintain the user capacity uniformly in the wireless area. Then, the communication system 1 can provide the communication services to the terminal equipments 20 uniformly in the area where the communication system 1 offers the communication services.

Particularly, the comparison unit 14 compares the reception level threshold value calculated by the calculation unit 13 with the actual reception power of the call received by the transmission/reception unit 11. When the actual reception power of the call is less than the reception level threshold value, the judgment unit 16 and the control unit 17 judge that the terminal equipment 20 is located at the edge of the wireless area, and accept the new call from the terminal equipment 20. On the other hand, when the reception power of the call is more than the reception level threshold value, the judgment unit 16 and the control unit 17 judge that the terminal equipment 20 is near the base station 10, and restrict the new call from the terminal equipment 20 by refusing the call. As a result, the base station 10 can maintain the user capacity at the edge of the wireless area covered by the base station 10. Therefore, the density distribution of the terminal equipments 20 connecting the lines with the base station 10 can be made uniform, and the user capacity can be maintained uniformly in the wireless area.

On the other hand, in the case where the terminal equipment 20 performs the transmission power control and the reception power values of the calls from the terminal equipments 20 received by the transmission/reception unit 11 of the base station 10 are equal, when the interference quantity is more than the allowable interference quantity, the comparison unit 14, the judgment unit 16 and the control unit 17 control the acceptance of the call based on the transmission power of the call transmitted by the terminal equipment 20. Therefore, by refusing the call from the terminal equipment 20 which shows the small transmission power of the call and is considered to be located near the base station 10, the control unit 17 can restrict the call. Furthermore, the control unit 17 can accept the call from the terminal equipment 20, which shows the large transmission power of the call and is considered to be located at the edge of the wireless area. Specifically, by refusing the call from the terminal equipment 20 located near the base station 10, which is easy to connect the line with the base station 10, the control unit 17 can restrict the call. The control unit 17 can accept the call from the terminal equipment 20 located at the edge of the wireless area, which is hard to connect the line with the terminal equipment 20.

As a result, the base station 10 can prevent occurrence of a situation that the terminal equipments 20 which communicate with the base station 10 concentrate near the base station 10, and substantial user capacity at the edge of the wireless area covered by the base station 10 decreases, due to an increase of the interference. Thus, the base station 10 can maintain the user capacity at the edge of the wireless area. Therefore, the density distribution of the terminal equipments 20 connecting the lines with the base station 10, which is liable not to be uniform by influence of the interference wave from the communication system 2, can be made uniform. And the base station 10 can maintain the user capacity uniformly in the wireless area. Then, the communication system 1 can provide the communication services to the terminal equipments 20 uniformly in the area where the communication system 1 offers the communication services.

Particularly, the comparison unit 14 compares the transmission level threshold value calculated by the calculation unit 13 with the actual transmission power of the call transmitted by the terminal equipment 20. When the actual transmission power of the call is more than the transmission level threshold value, the judgment unit 16 and the control unit 17 judge that the terminal equipment 20 is located at the edge of the wireless area, and accept the new call from the terminal equipment 20. On the other hand, when the actual transmission power of the call is less than the transmission level threshold value, the judgment unit 16 and the control unit 17 judge that the terminal equipment 20 is near the base station 10, and restrict the new call from the terminal equipment 20 by refusing the call. As a result, the base station 10 can maintain the user capacity at the edge of the wireless area covered by the base station 10. Therefore, the density distribution of the terminal equipments 20 connecting the lines with the base station 10 can be made uniform, and the user capacity can be maintained uniformly in the wireless area.

Second Embodiment

Next, a second embodiment of the present invention will be described with reference to the drawings.

(Communication System)

Figure 6:
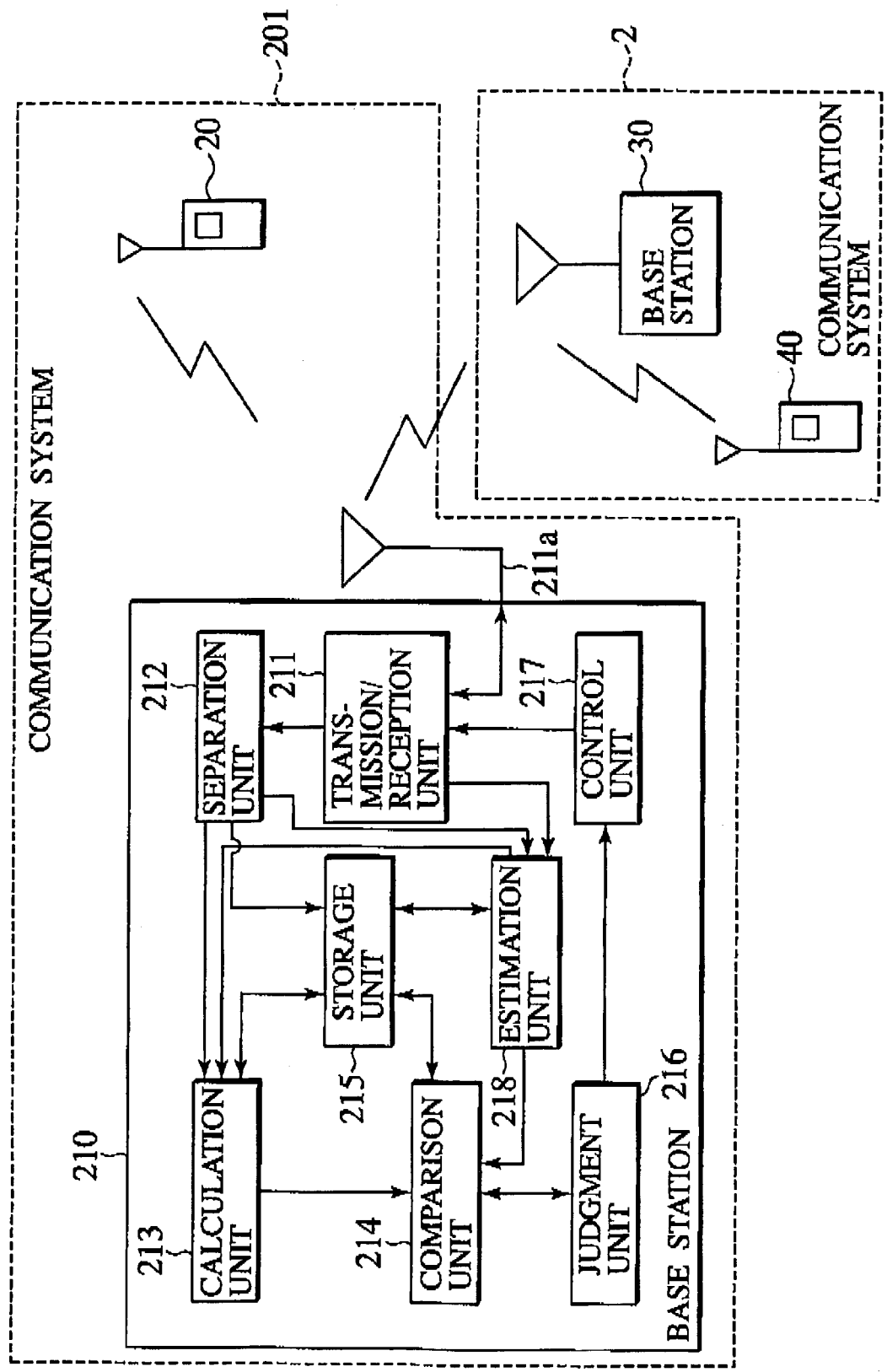
FIG. 6 is a drawing illustrating a configuration of a communication system according to a second embodiment of the present invention.

As shown in FIG. 6, a base station 210 is provided in a communication system 201. In addition, the communication system 201 includes a terminal equipment 20. In FIG. 6, the terminal equipment 20 and a communication system 2 including a base station 30 and a terminal equipment 40 are substantially the same as those in FIG. 1. Therefore, the same reference numerals are given to the same constituent components as those in FIG. 1, and descriptions for them are omitted. Furthermore, the base station 210 comprises a transmission/reception unit 211, an antenna 211a, a separation unit 212, a calculation unit 213, a comparison unit 214, a storage unit 215, a judgment unit 216, a control unit 217, and an estimation unit 218. The transmission/reception unit 211, the antenna 211a, the separation unit 212, the storage unit 215 and the control unit 217 are substantially the same as the transmission/reception unit 11, the antenna 11a, the separation unit 12, the storage unit 15 and the control unit 17 in FIG. 1. Accordingly, descriptions for them are omitted. Furthermore, the calculation unit 213 is substantially the same as the calculation unit 13 illustrated in FIG. 1 except that the calculation unit 213 does not calculate the reception level threshold value and the transmission level threshold value. Therefore, the descriptions for the calculation unit 213 are omitted.

When the transmission/reception unit 211 receives the new call from the terminal equipment 20, the estimation unit 218 measures the distance between the base station 210 and the terminal equipment 20 by estimating the distance, in accordance with the instruction of the judgment unit 216. The estimation unit 218 inputs the measurement value of the distance between the base station 210 and the terminal equipment 20 that transmitted the call. The estimation unit 218 acquires the reception power, with which the transmission/reception unit 11 receives the call transmitted from the terminal equipment, the transmission power information indicating the value of the transmission power, with which the terminal equipment 20 transmits the radio wave, and the sum of the antenna gains of the base station 210 and the terminal equipment 20, from the separation unit 212. Then, in the same manner of the estimation unit 18 shown in FIG. 1, the estimation unit 218 measures the distance between the terminal equipment 20, which transmits the new call, and the base station 10, by the calculation using the equations (1) and (2), based on the above described data.

Furthermore, when the communication system 201 uses the TDD system, the estimation unit 218 acquires the wireless timing of the terminal equipment 20, which transmits the new call, and the wireless timing of the base station 210, from the transmission/reception unit 211. Then, the estimation unit 218 measures a time difference between the wireless timing of the terminal equipment 20 and the wireless timing of the base station 210 in the same manner of the estimation unit 18 shown in FIG. 1. Subsequently, based on the time difference, the estimation unit 218 may measure the distance between the terminal equipment 20 and the base station 210 by the calculation using the equation (3).

The comparison unit 214 compares the interference quantity measured by the separation unit 212 with the allowable interference quantity calculated by the calculation unit 213 in the same manner of the comparison unit 14 shown in FIG. 1. Furthermore, the comparison unit 214 also compares the distance between the base station 210 and the terminal equipment 20, which transmits the new call received by the transmission/reception unit 211, with the distance threshold value. From the estimation unit 218, in accordance with the instruction of the judgment unit 216, the comparison unit 214 acquires the measured distance between the base station 210 and the terminal equipment 20, which transmits the new call. And the comparison unit 214 acquires the distance threshold value from the storage unit 215. The comparison unit 214 compares the distance threshold value with the distance between the base station 210 and the terminal equipment 20 that transmits the new call. To the judgment unit 216, the comparison unit 14 inputs the comparison result as to whether or not the distance between the base station 210 and the terminal equipment 20 which transmits the new call is equal to the distance threshold value or less.

In the same manner as that of the judgment unit 16 shown in FIG. 1, the judgment unit 216 acquires the comparison result from the comparison unit 214, which is obtained by comparing the interference quantity with the allowable interference quantity. Based on the comparison result, the judgment unit 216 judges whether or not the base station 210 executes the restriction on the acceptance of the call from the terminal equipment 20. When the interference quantity is more than the allowable interference quantity and the judgment unit 16 determines to execute the restriction on the acceptance of the call, the judgment unit 216 instructs the estimation unit 218 to measure the distance between the base station 210 and the terminal equipment 20, which transmits the new call. Then, the judgment unit 216 instructs the comparison unit 214 to compare the distance threshold value with the distance between the base station 210 and the terminal equipment 20 that transmits the new call.

Furthermore, the judgment unit 16 acquires the comparison result, which is obtained by comparing the distance threshold value with the distance between the base station 210 and the terminal equipment 20, which transmits the new call, from the comparison unit 214. Based on the acquired comparison result of the distance threshold value with the distance between the base station 210 and the terminal equipment 20, which transmits the new call, the judgment unit 216 judges whether or not the base station 210 executes the restriction on the acceptance of the call from the terminal equipment 20. In the case where the comparison result is that the distance between the base station 210 and the terminal equipment 20 which transmits the new call is more than the distance threshold value, the judgment unit 216 judges the terminal equipment 20 is located at the edge of the wireless area, and determines not to execute the restriction on the acceptance of the new call from the terminal equipment 20. In the case where the comparison result is that the distance between the base station 210 and the terminal equipment 20 which transmits the new call is equal to the distance threshold value or less is obtained, the judgment unit 216 judges that the terminal equipment 20 is located near the base station 210, and determines to execute the restriction on the acceptance of the new call from the terminal equipment 20. To the control unit 217, the judgment unit 216 inputs the determination result as to whether or not the base station 210 executes the restriction on the acceptance of the call from the terminal equipment 20.

(Communication Method)

Figure 7:
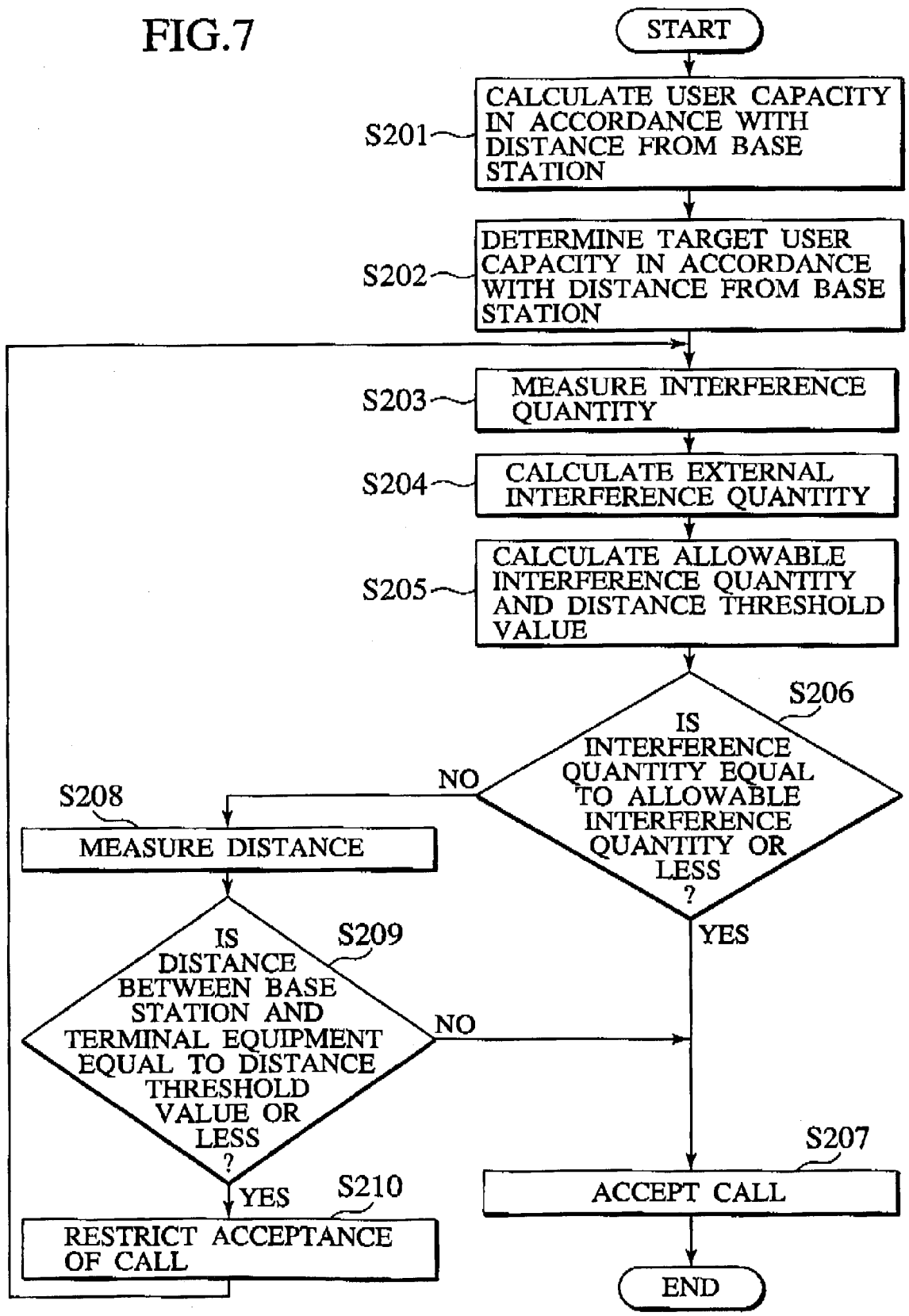
FIG. 7 is a flowchart illustrating a procedure of a communication method according to the second embodiment of the present invention.

Next, a communication method using the communication system 201 will be described with reference to FIG. 7. Herein, steps (S201) to (S207) are substantially the same as steps (S101) to (S107) shown in FIG. 5. Accordingly, descriptions for them are omitted.

In step (S206), when the comparison result is that the interference quantity has been more than the allowable interference quantity, the judgment unit 216 determines that the base station 210 executes the restriction on the acceptance of the call. Then, the judgment unit 216 instructs the estimation unit 218 to measure the distance between the base station 210 and the terminal equipment 20 that transmits the new call. Furthermore, the judgment unit 216 instructs the comparison unit 214 to compare the distance threshold value with the distance between the base station 210 and the terminal equipment 20, which transmits the new call. Then, the estimation unit 218 measures the distance between the base station 210 and the terminal equipment 20 that transmits the new call by estimating this distance (S208).

The comparison unit 214 acquires the distance between the base station 210 and the terminal equipment 20, which transmits the new call from the estimation unit 218, and acquires the distance threshold value from the storage unit 215. Then, the comparison unit 214 compares the distance threshold value with the distance between the base station 210 and the terminal equipment 20, which transmits the new call, and inputs the comparison result to the judgment unit 216 (S209).

In step (S209), when the comparison result by the comparison unit 214 is that the distance between the base station 210 and the terminal equipment 20 which transmits the new call is equal to the distance threshold value or less, the judgment unit 216 judges that the terminal equipment 20 is located near the base station 210. Then, the judgment unit 216 determines to execute the restriction on the acceptance of the new call from the terminal equipment 20. The judgment unit 216 inputs the determination result to the control unit 217. When the control unit 217 acquires the determination result that the base station 210 executes the restriction on the acceptance of the new call, the control unit 217 restricts the acceptance of the call by refusing the call from the terminal equipment 20 for which the restriction on the acceptance of the call is determined to be executed. Furthermore, the control unit 217 controls the transmission/reception unit 211 so that the transmission/reception unit 211 does not connect the line with the terminal equipment 20 (S210). Thereafter, the procedure returns to step (S203) and the base station 210 measures the interference quantity, and performs the control for the acceptance of the call.

On the other hand, in step (S209), when the comparison result by the comparison unit 214 is that the distance between the base station 210 and the terminal equipment 20 which transmits the new call is more than the distance threshold value, the judgment unit 216 judges that the terminal equipment 20 is located at the edge of the wireless area. Then, the judgment unit 216 determines not to execute the restriction on the acceptance of the new call from the terminal equipment 20. The judgment unit 216 inputs the determination result to the control unit 217. When the control unit 217 acquires the determination result that the base station 210 dose not execute the restriction on the acceptance of the new call, from the judgment unit 216, the control unit 217 controls the transmission/reception unit 211 so that the transmission/reception unit 211 normally accepts the call from the terminal equipment 20 (S207).

According to the base station 210 and the communication method, which are described as above, the comparison unit 214 compares the calculated distance threshold value with the measured distance between the base station 210 and the terminal equipment 20, which transmits the call. When the distance between the base station 210 and the terminal equipment 210, which transmits the call, is more than the distance threshold value, the judgment unit 216 and the control unit 217 judge that the terminal equipment 20 is located at the edge of the wireless area, and the new call from the terminal equipment 20 are accepted. On the other hand, when the distance between the base station 210 and the terminal equipment which transmits the call is less than the distance threshold value, the judgment unit 216 and the control unit 217 judge that the terminal equipment 20 is located near the base station 210, and refuse the new call from the terminal equipment 20 to restrict the acceptance of the call.

Specifically, by refusing the call from the terminal equipment 20 located near the base station 210, which is easy to connect the line with the base station 210, the comparison unit 214, the judgment unit 216 and the control unit 217 can restrict this call. The comparison unit 214, the judgment unit 216 and the control unit 217 can accept the call from the terminal equipment 20 located at the edge of the wireless area, which is hard to connect the line with the base station 210. As a result, the base station 210 can prevent occurrence of a situation that the terminal equipments which communicate with the base station 210, concentrate near the base station 10, and substantial user capacity at the edge of the wireless area covered by the base station 210 decreases due to an increase of the interference. Thus, the base station 210 can maintain the user capacity at the edge of the wireless area. Therefore, the density distribution of the terminal equipments 20 connecting the lines with the base station 210 can be made uniform. And the base station 210 can maintain the user capacity uniformly in the wireless area. Then, the communication system 201 can provide the communication services to the terminal equipments 20 uniformly in the area where the communication system 201 offers the communication services.

What is claimed is:

1. A base station of a communication system, comprising:
    an interference quantity measurement unit configured to measure an interference quantity in a frequency band used in the communication system;
    a reception unit configured to receive a line connection request transmitted from a mobile station;
    an allowable interference quantity calculation unit configured to calculate an allowable interference quantity in the frequency band based on a number of target users and a threshold distance, the threshold distance being smaller than a distance between the base station and an edge of a wireless area covered by the base station; and
    an acceptance control unit configured to control an acceptance of the line connection request by comparing the measured interference quantity with a calculated allowable interference quantity, and to refuse the line connection request transmitted from the mobile station within the threshold distance to the base station and accept the line connection request transmitted from the mobile station outside the threshold distance when a measured interference quantity exceeds the calculated allowable interference.

2. The base station according to claim 1, wherein the acceptance control unit is configured to refuse the line connection request when a reception power of the line connection request is higher than a reception power threshold value calculated based on the threshold distance.

3. The base station according to claim 1, wherein the acceptance control unit is configured to refuse the line connection request when a transmission power of the line connection request is lower than a transmission power threshold value calculated based on the threshold distance.

4. A communication method, comprising:
    measuring an interference quantity in a frequency band used in a communication system;
    receiving a line connection request transmitted from a mobile station;
    calculating an allowable interference quantity in the frequency band based on a number of target users and a threshold distance the threshold distance being smaller than a distance between the base station and an edge of a wireless area covered by the base station;

controlling an acceptance of the line connection request by comparing the measured interference quantity with a calculated allowable interference quantity; and refusing the line connection request transmitted from the mobile station within a threshold distance to the base station and accepting the line connection request transmitted from the mobile station outside the threshold distance when the measured interference quantity exceeds a calculated allowable interference.

5. The communication method according to claim 4, further comprising:

refusing the line connection request when a reception power of the line connection request is higher than a reception power threshold value calculated based on the threshold distance.

6. The communication method according to claim 4, further comprising:

refusing the line connection request when a transmission power of the line connection request is lower than a transmission power threshold value calculated based on the threshold distance.

\* \* \* \* \*